United States Patent [19]

Kommoss et al.

[11] Patent Number: 4,464,695
[45] Date of Patent: Aug. 7, 1984

[54] MAGNETIC TAPE CASSETTE APPARATUS HAVING AN OVER-TRAVEL PUSHBUTTON MOVEMENT

[75] Inventors: Klaus Kommoss, Wetzlar-Naunheim; Valentin H. Schütte, Wetzlar, both of Fed. Rep. of Germany

[73] Assignee: U.S. Philips Corporation, New York, N.Y.

[21] Appl. No.: 319,837

[22] Filed: Nov. 9, 1981

[30] Foreign Application Priority Data

Nov. 13, 1980 [DE] Fed. Rep. of Germany ....... 3042746

[51] Int. Cl.$^3$ ................ G11B 5/008; G11B 15/00; G11B 17/00
[52] U.S. Cl. .................................. 360/137; 360/69; 360/90; 360/96.4
[58] Field of Search .............. 360/137, 90, 96.4, 96.5, 360/96.6, 105; 242/197-200, 187

[56] References Cited

FOREIGN PATENT DOCUMENTS 1825198 1/1961 Fed. Rep. of Germany .

Primary Examiner—Robert M. Kilgore
Attorney, Agent, or Firm—David R. Treacy

[57] ABSTRACT

A magnetic tape-cassette apparatus comprising at least two push-buttons which have individual functions in the apparatus, when individually pushed in to produce a normal travel of their push-button rods, the individual push-button rods being releasably latched in the position in which the individual function is performed. The two push-button rods, when pushed in simultaneously, are depressible beyond the normal travel over a common overtravel path, to perform a further function, and a latching slide, which is movable to a release position for releasing the normal-travel latches, is retained in the release position by an intermediate slide when the push-button rods are in the overtravel range until the normal-travel latching projections have passed the latching cams during the outward movement of the push-button rods.

13 Claims, 4 Drawing Figures

MAGNETIC TAPE CASSETTE APPARATUS HAVING AN OVER-TRAVEL PUSHBUTTON MOVEMENT

BACKGROUND OF THE INVENTION

The invention relates to a magnetic-tape cassette apparatus comprising at least two push-buttons, which have individual functions in the apparatus when pushed in to produce a specific travel of their push-button rods, the individual push-button rods being releasably latched in the position in which the individual function is performed.

Magnetic-tape cassette equipment of this type is generally known. When actuated individually each push-button has a specific function, which is performed upon depression of the push-button. In addition it is known from radio sets to assign for example a third function of the apparatus to two push-buttons in combination. This third function is obtained upon combined depression of the push-buttons over the normal travel through actuation of an electrical switch.

SUMMARY OF THE INVENTION

It is an object of the invention to construct a magnetic-tape cassette apparatus having two push-button rods which can be pushed in simultaneously to perform a further mechanical function, and to ensure that the push-button rods correctly return to the positions corresponding to their basic functions.

In a magnetic-tape cassette apparatus in accordance with the invention this object is achieved in that
the push-buttons rods can be latched at the end of the normal travel for the individual functions, by engagement of latching pins or projections on the rods behind latching cams on a latching slide,
the two push-button rods, when pushed in simultaneously, can be depressed beyond the travel for the individual functions over a common overtravel path, upon which overtravel the push-button rods together perform one further function, and
the latching slide, which is movable to a release position for releasing the latching projections, can be retained in the release position by means of an intermediate slide when the push-buttons rods are in the overtravel range and until the latching projections have passed the latching cams during outward movement of the push-button rods.

The additional function, which may be a mechanical or electrical function, is thus obtained via the overtravel path. Such a function may involve mechanical actuation; for example, the movement of the cassette holder or the actuation of, for example, a cassette-retraction mechanism. The intermediate slide then ensures that the push-button rods are able to move past the latching cams when returning to their initial positions.

A preferred embodiment of the invention is characterized in that
the intermediate slide is movable in the actuating direction of the push-button rods,
the intermediate slide is provided with a guide pin which extends through a slot in one of the push-button rods, and through an elongate guide opening in the latching slide,
the intermediate slide has a slot through which the latching projection of the push-button rod having a slot extends the slots and the guide opening extend in the actuating direction of the push-button rods and cooperate with the guide pin and the latching projection in such a way that the intermediate slide is not influenced by the push-button rod movements in the range of normal travel, but is moved upon depression of the rods into the overtravel range; and upon release of the rods the intermediate slide remains in the depressed position until the latching projection which passes through the slot in the intermediate slide has moved past the latching cam, after which the push-button rod moves the intermediate slide during the residual return movement in order to release and return the latching slide to its latched position.

In a further preferred embodiment, the length and location of the slot in the intermediate slide are such that at the beginning of the overtravel the latching projection of the push-button rod with the slot butts against the inner end of the slot in the intermediate slide in order to move the intermediate slide with the push-button during the overtravel; and that when the push-button rods return to their initial positions the same latching projection butts against the outer end of said slot in order to move the intermediate slide outward again as soon as the latching projection has moved past the latching cam. In order to ensure that the intermediate slide does not prematurely return to the initial position, the guide pin of the intermediate slide is retained with increased friction in that part of the slot in the latching slide where the guide pin is disposed at the end of the overtravel path of the push-button rod.

An embodiment of the invention will be described in more detail with reference to the drawing.

DESCRIPTION OF THE PREFERRED EMBODIMENT

Figure 1:
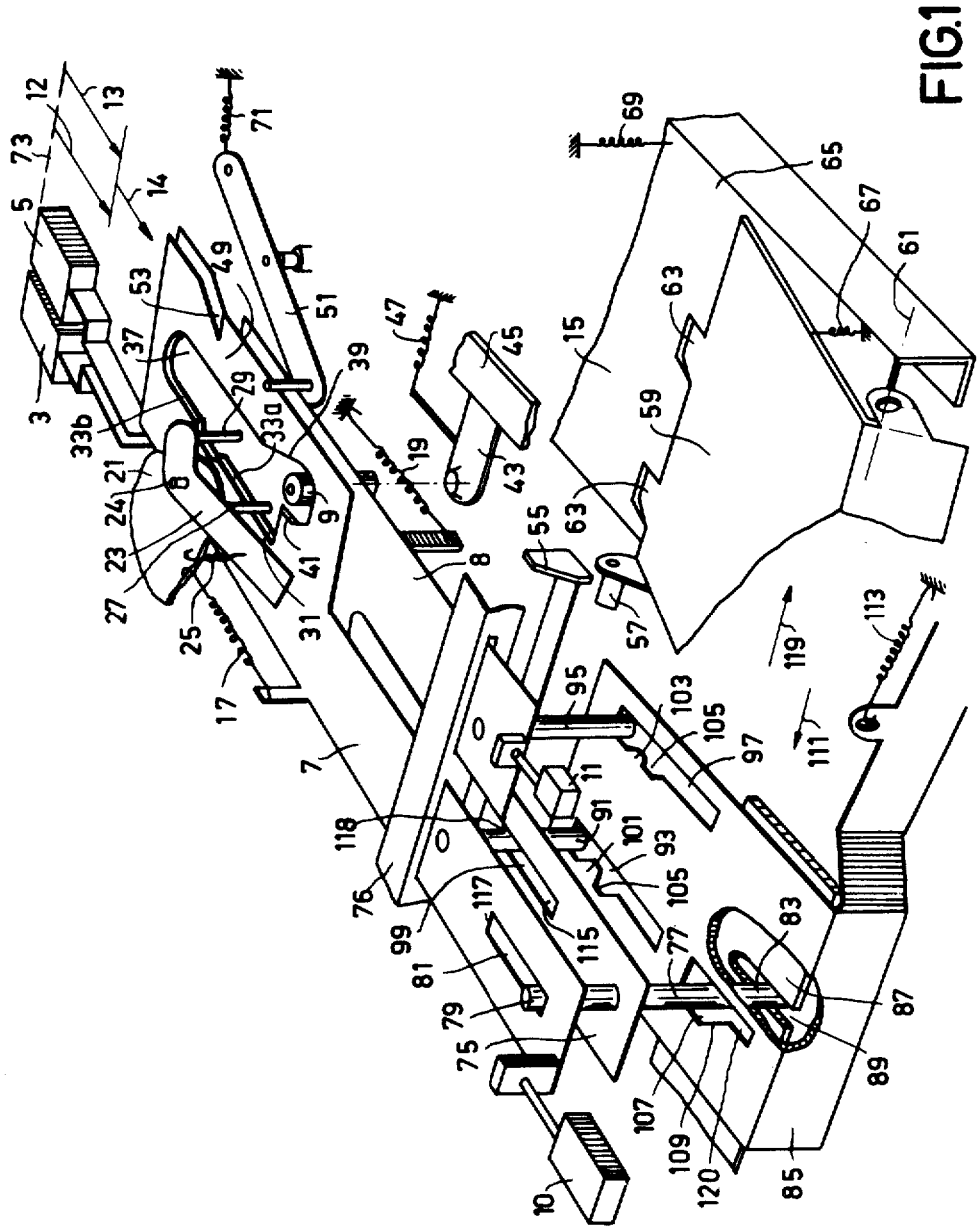
FIG. 1 is a diagrammatic perspective view of the latching mechanism of two push-buttons.

FIG. 1 illustrates the operation of two separately but also simultaneously depressible push-buttons 3 and 5. The push-buttons 3 and 5 are mounted on push-button rods 7 and 8. When the push-button 3 or 5 is depressed separately the individual functions are performed, as well as a common function which is to lift the head slide with the magnetic head and capstan pressure rollers off the tape and the capstans. This lifting is effected by means of an actuating roller guided by a lifting contour, to be described in more detail hereinafter, and is effected upon depression of each push-button. Electrical switches 10 and 11, which switch the apparatus electrically to fast forward or fast reverse operation, are associated with the individual push-button rods 7 and 8.

When the push-buttons 3 and 5 are individually depressed in order to obtain the individual functions the push-button rods 7 and 8 are pushed inwards over a travel 12 and 13 to a position in which a respective apparatus function is performed.

In the case of separate depression these travels are clearly defined. If the two push-button rods 7 and 8 are pushed simultaneously, the individual travels 12 and 13 may be extended by a common overtravel path 14. During the overtravel 14 a third function can be performed, which in the present example is of a mechanical nature: to move a cassette holder 15 into an ejection position. However, it is evident that it is also possible to perform further, electrical functions. In addition to these functions, it must be ensured that after release at the end of the overtravel path the two push-button rods 7 and 8 return to their initial positions and are not latched in the normal-travel position at the end of the normal travel.

Figure 2:
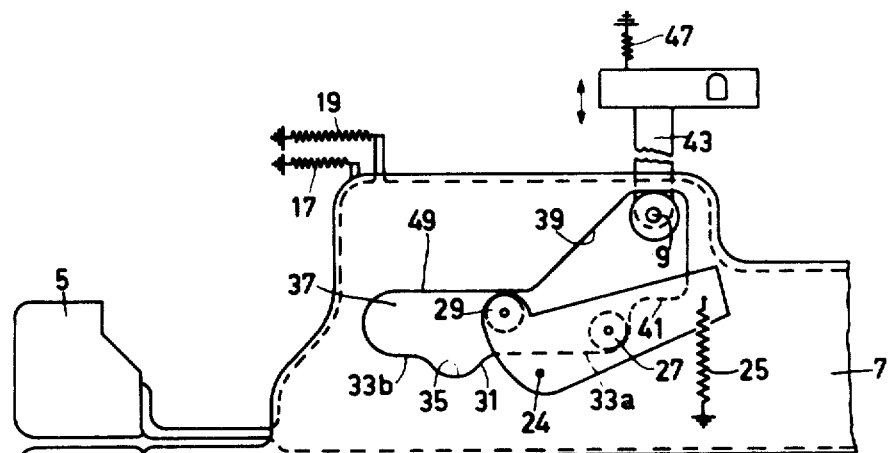
FIGS. 2 to 4 are diagrammatic views of the interlocking mechanism of the two push-buttons in the three functional positions: the rest or initial position, the normal travel position for an individual function, and the overtravel position for the common function.
Figure 3:
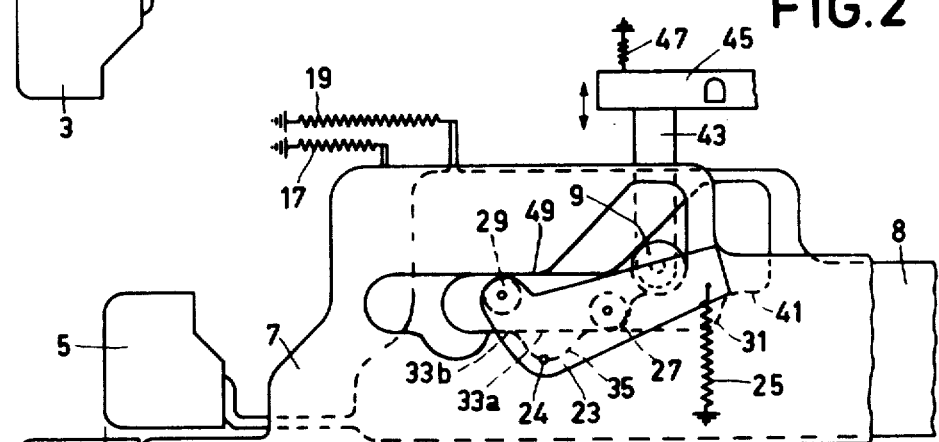

Hereinafter, the operation of the push-button rod mechanism will be described in more detail. The push-button rods 7 and 8 are urged in the direction of the initial positions by means of tension springs 17 and 19. A catch 23 is journalled on a fixed chassis part 21, shown schematically, so as to be pivotable about a spindle 24. The catch 23 is urged in a clockwise direction by means of a tension spring 25 having one end fixed to the chassis part 21. On the catch two follower pins 27 and 29 are arranged. These follower pins 27 and 29 follow a pair of guide contours 31 along corresponding portions of the perimeter of openings 37 in the push-button rods. The guide contours for both push-button rods 7 and 8 are identical and are in register with one another when the push-button rods are not shifted relative to each other. Each guide contour 31 comprises two portions 33a and 33b extending in the actuating direction, between which a receding portion 35 is located. In the initial position represented in FIGS. 1 and 2 the follower pin 27 is located on the portions 33a of the guide contours 31. The follower pin 29 is disposed at but not in contact with the edge of the receding portion 35.

In addition to the guide contour along one side of the perimeter of each opening 37 there is also provided a lifting contour 39 along the opposite side, which is also identical for both push-button rods, if the push-button rods are not shifted relative to each other. An actuating roller 9 is disposed adjacent the lifting contour 39 and opposite a stop edge 41 which is identical for both push-button rods, when they are in the initial or rest position.

If one of the push-button rods, for example the push-button rod 8, is pushed in by the push-button 5, the actuating roller 9 is moved towards the stop edge 41 by the lifting contour 39 of the depressed push-button rod. The actuating roller 9 is connected to an arm 43 which then moves the head slide 45 against the action of a tension spring 47. When the actuating roller 9 contacts the stop edge 41 the end of the travel 13 is reached because the roller 9 is captured between the contour 39 of the depressed rod and the edge 41 of the other rod which is in the initial position. The follower pin 27 is still disposed on the portion 33a of the guide contour 31. At the same time that the push-button rod 8 is pushed in the switch 11 for fast reverse operation is actuated. When the button 5 is released the push-button rod 8 returns to its initial position.

Figure 4:
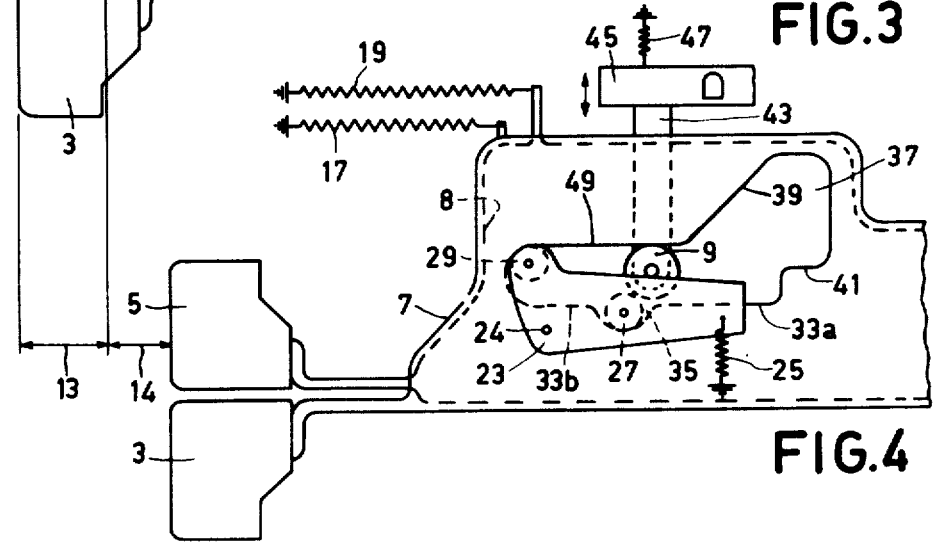

When the push-button rods 7 and 8 are actuated simultaneously they first pass through their common paths of travel 12 and 13. The actuating roller 9 again follows the lifting contour 39. However, since both push-button rods 7 and 8 have now been actuated, the two stop edges 41 are also moved in the actuating direction, as shown in FIG. 4. As a result, these stop edges 41 no longer limit the movement of the actuating roller 9, which can now move past the stop edges 41, out of engagement by the contour 39 so as to be positioned by an extension contour 49 parallel to the direction of rod movement. The follower pin 27 moves into the receding portion 35 and the follower pin 29 is moved upward and to the right (as viewed in FIG. 4) as the catch 23 can now be pivoted clockwise by the spring 25, thereby enabling a further depression of the rods down to the end of the overtravel path 14. At the end of this overtravel path a latching lever 51 engages notches 53 in the push-button rods 7 and 8.

As shown in FIG. 1, the push-button rod 8 is provided with a ramp surface 55. When the two push-button rods 7 and 8 are pushed into the overtravel range the ramp surface contacts a slide pin 57 on a pivotal lever 59 of the cassette holder 15. This pivotal lever, which is pivotable about an axis 61, has tabs 63 which press against the upper surface 65 of the cassette holder 15. In the rest position the tabs 63 on the pivotal lever 39, which is urged in a clockwise direction by a spring 67, hold the cassette holder 15 downwards. However, if the slide pin 57 runs onto the ramp surface 55 upon depression into the overtravel range 14, the tabs 63 are lifted. The cassette holder 15 follows this upward movement under the influence of a biasing spring 69. In the lifted position of the cassette holder 15 a cassette may be exchanged. Upon release of the latching lever 51, which is biased by a spring 71, the push-button rods 7 and 8 return to their initial positions at the line 73. To ensure that the push-button rods 7 and 8 can only move in the direction of depression, they pass through a guide 76.

An intermediate slide 75 ensures a simultaneously return to the line 73. The intermediate slide 75 comprises a guide pin 77, which projects upwards and downwards. The upper part 79 of the guide pin extends through a slot 81 of the push-button rod 7. The lower part 83 of the guide pin 77 extends through a latching slide 85 and then through a guide slot 89 in a guide member 87 which is rigidly connected to the chassis. A guide pin 91, which also serves as a latching projection, is arranged on the push-button rod 7, the guide pin extending into a slot 93 of the latching slide 85. A guide pin 95 on the push-button rod 8 extends into a slot 97, corresponding to the slot 93, in the latching slide 85. Between the slot 93 and the push-button rod 7 the guide pin 91 also passes through a slot 99 in the intermediate slide 75.

The slots 93 and 97 have respective latching cams 101, 103 formed on longitudinal edges of the slots. Latching recesses 105, which are disposed behind the latching cams in the direction of the actuations, serve to latch the individual push-button rods at the end of the normal travel path 12 or 13. The guide pin 77 also extends through a guide opening 107 in the latching slide 85 between the intermediate slide 75 and the guide member 87. This guide opening has a release contour 109, which co-operates with the lower part 83 of the guide pin 77.

If one of the push-button rods 7 or 8 is separately pushed inwards over the path length 12 or 13, the respective guide pin 91 or 95 is moved past the latching cam 101 or 103, thereby moving the latching slide first in the direction of arrow 111 against the action of a biassing spring 113, and then permitting the spring 113 to move the slide 85 in the direction of arrow 119 to latch the guide pin in the latching recess 105. By again moving the latching slide 85 in the direction of the arrow 111 the latched guide pin is released and the push-button rod returns to its initial position.

If the two push-buttons 3 and 5 are depressed simultaneously, the guide pin 91 moves from the outer slot end 118 to the inner slot end 115 of the slot 99 in the intermediate slide 75. This corresponds to the pathlength 12 or 13. Within the range of these paths the intermediate slide 75 is not moved. When both push-button rods 7 and 8 are pushed further inwards the guide pin 91 engages the inner end 115 of slot 99, and causes a movement of the intermediate slide over the overtravel path to a rearward or overtravel position (not shown). Via the release contour 109 the guide pin 77 moves the latching slide 85 sideways in the direction of the arrow 111 to the release position and the guide pin 77 penetrates a narrow end portion 120 of the guide opening 107. By roughening the surface or providing a friction surface the guide pin 77 is retained in this narrow end portion because of the increased friction. During the movement of the slide 75 through the overtravel path 14 the upper end portion 79 of the guide pin 77 butts against the outer end 117 of the slot 81 in the push-button rod 7.

A simultaneous return of the push-button rods 7 and 8 to the initial position at the line 73, upon releasing the latching lever 51, is possible because of the intermediate slide. When the push-button rods 7 and 8 move outwards the guide pin 91 initially moves in the slot 99 and the upper end 79 of the guide pin 77 moves in the slot 81 while the intermediate slide 75 remains in the overtravel position. The latching slide is retained in its release position by means of the guide pin 77, because the guide pin 77 is retained in the narrow end portion 120 of the guide opening 107. Since the latching slide 85 is retained in the release position, the guide pins 91 and 95 can pass the latching recesses 105 and the latching cams 101 and 103. After having passed the latching cams 101 and 103 the guide pin 91 butts against the outer end 118 of the slot 99 in the intermediate slide 75. Consequently, the intermediate slide is moved by the guide pin 91 from the overtravel position and the pin 77 is withdrawn from the narrow end portion 120 of the guide opening 107. The latching slide 85 is thus released and is free to return to the latched position in the direction of the arrow 119 under the influence of the spring 113. At the end of the outward movement the buttons 3 and 5 are again disposed at the line 73 and the push-button rods 7 and 8 are in the initial position.

What is claimed is:

1. An interlocked control mechanism for controlling a plurality of apparatus functions, comprising at least two rods mounted for individual movement from an initial position over a given travel in an actuating direction for controlling respective individual apparatus functions, in response to individual movement of a rod; and means for individually latching a rod, which has been moved said given travel, in a position in which a respective apparatus function is performed, characterized in that the mechanism further comprises a respective latching projection arranged on each of said rods, a latching slide movable between a latched position and a release position, and having respective latching cams arranged to engage a respective latching projection of a rod which is in the position in which the individual function is performed while the latching slide is in the latched position, means, responsive to the simultaneous movement of said at least two words from the initial position over said given travel, for permitting movement of said two rods over a common overtravel path past the position in which the individual function is performed, and an intermediate slide arranged to retain said latching slide in the release position while the rods are in the overtravel path moving toward the initial position, until the latching projections have passed the latching cams.

2. A mechanism as claimed in claim 1, characterized in that one of the rods, and the intermediate slide, each have a slot therethrough, and the latching slide has an elongate guide opening, said slots and guide opening extending in said actuating direction, the intermediate slide is mounted to be movable in said actuating direction, and further comprises a guide pin extending through the slot in said one of the pushbutton rods and through the elongate guide opening in the latching slide, the latching projection of said one of the pushbutton rods having a slot extends through the slot in the intermediate slide, and said guide pin, latching projection of said one rod, slots and opening are arranged such that the intermediate slide is not influenced by pushbutton rod movements in the range of normal travel, and that upon depression of the rods into the overtravel range the intermediate slide is moved toward an overtravel position; and upon release of the rods the intermediate slide remains in the overtravel position until the latching projection which extends through the slot in the intermediate slide has moved past the latching cam, after which the pushbutton rod moves the intermediate slide during the remaining return movement to the initial position in order to release and permit the latching slide to return to its latched position.

3. A mechanism as claimed in claim 2, characterized in that the slot in the intermediate slide is so arranged that at the beginning of the overtravel movement the latching projection of the pushbutton rod having a slot butts against an inner end of the slot in the intermediate slide in order to move the intermediate slide, and when the pushbutton rods are moving toward their initial positions said latching projection butts against an outer end of said intermediate slide slot to move the intermediate slide as soon as the latching projection has moved past the latching cam.

4. A mechanism as claimed in claim 3, characterized by comprising means for retaining the guide pin of the intermediate slide in that part of the slot in the latching slide, where the guide pin is disposed at the end of the overtravel path of the pushbutton rod, by increased friction.

5. A mechanism as claimed in claim 2, characterized by comprising means for retaining the guide pin of the intermediate slide in that part of the slot in the latching slide, where the guide pin is disposed at the end of the overtravel path of the pushbutton rod, by increased friction.

6. A mechanism as claimed in claim 2, characterized in that said latching slide is movable transversely to said actuating direction, said elongate guide opening in the latching slide having a laterally enlarged portion through which the guide pin passes when the intermediate slide is in the latching position, and the mechanism further comprises means for biassing the latching slide toward the latched position.

7. A magnetic-tape cassette apparatus comprising at least two pushbuttons arranged to be individually depressible from an initial position over a given normal travel for controlling respective individual functions of the apparatus, two pushbutton rods respectively connected to the pushbuttons and arranged to be movable from an initial position over said given travel in an actuating direction; and means for individually latching a rod, which has been moved said given travel, in a position in which a respective apparatus function is performed, characterized in that the apparatus further comprises

- a respective latching projection arranged on each of said rods, extending in a direction transverse to said actuating direction,
- a latching slide movable in a direction transverse to said actuating direction between a latched position and a release position, and having respective latching cams arranged to engage a respective latching projection of a rod which is in the position in which the individual function is performed while the latching slide is in the latched position,
- means, responsive to simultaneous movement of said at least two rods from the initial position over said given travel, for permitting movement of said two rods over a common overtravel path past the position in which the individual function is performed, and
- an intermediate slide arranged to retain said latching slide in the release position while the rods are in the overtravel path moving toward the initial position, until the latching projections have passed the latching cams.

8. An apparatus as claimed in claim 7, characterized in that

- one of the pushbutton rods, and the intermediate slide, each have a slot therethrough, and the latching slide has an elongate guide opening, said slots and guide opening extending in said actuating direction,
- the intermediate slide is mounted to be movable in said actuating direction, and further comprises a guide pin extending through the slot in said one of the pushbutton rods and through the elongate guide opening in the latching slide,
- the latching projection of said one of the pushbutton rods having a slot extends through the slot in the intermediate slide, and
- said guide pin, latching projection of said one rod, slots and opening are arranged such that the intermediate slide is not influenced by pushbutton rod movements in ther range of normal travel, and that upon depression of the rods into the overtravel range the intermediate slide is moved toward an overtravel position; and upon release of the rods the intermediate slide remains in the overtravel position until the latching projection which extends through the slot in the intermediate slide has moved past the latching cam, after which the pushbutton rods moves the intermediate slide during the remaining return movement to the initial position in order to release and permit the latching slide to return to its latched position.

9. An apparatus as claimed in claim 8, characterized in that the slot in the intermediate slide is so arranged that at the beginning of the overtravel movement the latching projection of the pushbutton rod having a slot butts against an inner end of the slot in the intermediate slide in order to move the intermediate slide, and when the pushbutton rods are moving toward their initial positions said latching projection butts against an outer end of said intermediate slide slot to move the intermediate slide as soon as the latching projection has moved past the latching cam.

10. An apparatus as claimed in claim 9, characterized by comprising means for retaining the guide pin of the intermediate slide in that part of the slot in the latching slide, where the guide pin is disposed at the end of the overtravel path of the pushbutton rod, by increased friction.

11. An apparatus as claimed in claim 8, characterized by comprising means for retaining the guide pin of the intermediate slide in that part of the slot in the latching slide, where the guide pin is disposed at the end of the overtravel path of the pushbutton rod, by increased friction.

12. A mechanism as claimed in claim 8, characterized in that said latching slide is movable transversely to said actuating direction, said elongate guide opening in the latching slide having a laterally enlarged portion through which the guide pin passes when the intermediate slide is in the latching position, and the apparatus further comprises means for biassing the latching slide toward the latched position.

13. An apparatus as claimed in claim 8, characterized in that said apparatus comprises a cassette holder and means for moving the cassette holder from a playing position to a cassette-exchanging position in response to movement of the intermediate slide fom a normal position to the overtravel position.

* * * * *

UNITED STATES PATENT AND TRADEMARK OFFICE
CERTIFICATE OF CORRECTION

PATENT NO. : 4,464,695
DATED : August 7, 1984
INVENTOR(S) : KLAUS KOMMOSS ET AL

It is certified that error appears in the above-identified patent and that said Letters Patent is hereby corrected as shown below:

Column 5, line 66, claim 1, change "words" to --rods--.

Signed and Sealed this

Twenty-fifth Day of December 1984

[SEAL]

Attest:

GERALD J. MOSSINGHOFF

*Attesting Officer*

*Commissioner of Patents and Trademarks*